(12) United States Patent  
Edelstein et al.

(10) Patent No.: US 9,350,775 B2  
(45) Date of Patent: *May 24, 2016

(54) METHOD TO INITIATE SERVER BASED COLLABORATION ON E-MAIL ATTACHMENTS

(71) Applicant: MICROSOFT TECHNOLOGY LICENSING, LLC, Redmond, WA (US)

(72) Inventors: Noah Edelstein, Seattle, WA (US); Andrew Quinn, Seattle, WA (US); Anne Archambault, Redmond, WA (US); Ethan Bernstein, Seattle, WA (US); Marcin Sawicki, Kirkland, WA (US); Hani Saliba, Seattle, WA (US); Hai Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/225,956

(22) Filed: Mar. 26, 2014

(65) Prior Publication Data

US 2014/0207891 A1    Jul. 24, 2014

Related U.S. Application Data

(63) Continuation of application No. 10/376,764, filed on Feb. 28, 2003, now Pat. No. 8,719,325.

(51) Int. Cl.
| | |
|---|---|
| *G06F 15/16* | (2006.01) |
| *H04L 29/06* | (2006.01) |
| *G06Q 10/10* | (2012.01) |
| *H04L 12/18* | (2006.01) |

(52) U.S. Cl.
CPC ............... *H04L 65/403* (2013.01); *G06Q 10/10* (2013.01); *G06Q 10/107* (2013.01); *H04L 12/1813* (2013.01)

(58) Field of Classification Search
None
See application file for complete search history.

(56) References Cited

U.S. PATENT DOCUMENTS

| | | | | |
|---|---|---|---|---|
| 6,292,813 | B1 * | 9/2001 | Wolfe | ............................ 715/205 |
| 6,505,236 | B1 | 1/2003 | Pollack | |
| 6,643,683 | B1 * | 11/2003 | Drumm et al. | ................ 709/203 |

(Continued)

FOREIGN PATENT DOCUMENTS

| | | |
|---|---|---|
| AU | 2003258256 | 3/2004 |
| TW | 425514 | 3/2001 |

(Continued)

OTHER PUBLICATIONS

Kontzer, T., "Getting the Message-Companies look for Secure Messaging and Collaboration Platforms to Enhance E-Mail and Preserve Knowledge", Informationweek, May 5, 2003, 938, 39.

(Continued)

*Primary Examiner* — Joshua Joo  
(74) *Attorney, Agent, or Firm* — Juilie Kane Akhter; Tom Wong; Micky Minhas

(57) ABSTRACT

Server-based collaboration is initiated by an email. When the user creates the email message with attachments, a collaboration website is provisioned. The collaboration website allows collaborations on the attached documents by the recipients of the message. The ease of collaboration with email and the advantages of the collaboration server are thus both available to the user.

16 Claims, 3 Drawing Sheets

(56) References Cited

U.S. PATENT DOCUMENTS

| | | |
|---|---|---|
| 6,654,032 B1 | 11/2003 | Zhu et al. |
| 6,678,698 B2 | 1/2004 | Fredell et al. |
| 6,760,886 B1 | 7/2004 | Nadon et al. |
| 7,409,424 B2 | 8/2008 | Parker |
| 8,156,191 B2 * | 4/2012 | Halahmi ............ H04L 65/4069 709/206 |
| 2001/0028364 A1 | 10/2001 | Fredell et al. |
| 2002/0069247 A1 * | 6/2002 | Paknad et al. ................. 709/204 |
| 2002/0099775 A1 | 7/2002 | Gupta et al. |
| 2002/0138582 A1 | 9/2002 | Chandra et al. |
| 2002/0174010 A1 * | 11/2002 | Rice, III ......................... 705/14 |
| 2003/0028600 A1 | 2/2003 | Parker |
| 2003/0105858 A1 | 6/2003 | Hogg et al. |
| 2003/0135565 A1 * | 7/2003 | Estrada ......................... 709/206 |
| 2004/0034688 A1 * | 2/2004 | Dunn ............................ 709/206 |
| 2004/0107256 A1 | 6/2004 | Odenwald et al. |
| 2004/0158607 A1 * | 8/2004 | Coppinger .............. H04L 51/08 709/206 |
| 2004/0205653 A1 | 10/2004 | Hadfield et al. |
| 2005/0210393 A1 | 9/2005 | Maeng |
| 2006/0167879 A1 | 7/2006 | Umeki et al. |

FOREIGN PATENT DOCUMENTS

| | | |
|---|---|---|
| TW | 461212 | 10/2001 |
| WO | WO 02/19131 A1 | 3/2002 |

OTHER PUBLICATIONS

O'Brien, J. M., "Oracle Heats Up Collaboration Software Arena", Computer Dealer News, Sep. 6, 2002, 18,16,11(1).

Renganarayanan, V. et al., "Internet Agents for Effective Collaboration", International Workshop on Mobile Agents for Telecommunication Applications, 2002, 2521, 33-47.

Koch, T. et al., "Beyond Web Technology—Lessons Learnt from BSCW", Proceedings IEEE International Workshops on Enabling Technologies: Infrastructure for Collaborative Enterprises, 1998, 176-181, XP-002193485.

Mariani, J.A. et al., "Cooperative Information Sharing: Developing a Shared Object Service", Computer Journal, 1996, 39(6), 455-470.

Novell, Inc, "Users's Guide for Windows 32-Bit; chapter 3: Working with Items in your Mailbox; Chapter 9; Creating and Working with Documents", Sep. 2000, 1-40,159-228, XP-002277171.

Hosoya, "Intraware Catalogue", net 8 PC, The Guide to New Computing, National Technical Journal, ASCII Corporation, Aug. 1, 1997, 2(8), 2-7.

Shimouchi, "Group Wise 5.2J in a WWW browser", Lan Times, Softbank Corp., National Technical Journal, Feb. 1, 1998, 8(2), 2-7.

TW Patent Application No. 093104671: Taiwan Search Report, May 18, 2010, 2 pages.

Tabuchi et al.; "Office Accelerator System: Proposal and Implementation of Collaborative Editing of Web Page Documents by Means of OLE Protocol Based Editing Tools"; Information Processing Society of Japan; vol. 40 No. 11; Nov. 1999; pp. 3868-3877; contains English Abstract.

Conen et al.; "Working Group Report on Web-based Infrastructures for Collaborative Enterprises: Ready for a Second Generation?"; IEEE Enabling Technologies Infrastructure for Collaborative Enterprises; 1998; 4 pages.

Appelt et al.; "Participatory Groupware Development: Email Interaction between Users and Developers of the BSCW System"; ECSCW 1999 Workshop; 1999; 5 pages.

* cited by examiner

METHOD TO INITIATE SERVER BASED COLLABORATION ON E-MAIL ATTACHMENTS

CROSS REFERENCE TO RELATED APPLICATION

This application is a continuation of, and claims benefit of priority to, U.S. patent application Ser. No. 10/376,764, filed Feb. 28, 2003. The contents of that application are hereby incorporated by reference herein.

FIELD OF THE INVENTION

This invention relates to the field of document management, and in particular to a method and system for initiating and managing server-based collaboration.

BACKGROUND OF THE INVENTION

Computer systems allow users to create, view, and modify documents using various applications. A document is a collection of data in one or more files. For example, data in a document may represent text, graphic, spreadsheet, audio, video, meta-data about the document, or any combination of two or more of these.

Often, there is a need for multiple users to collaborate on a single document. This can be done by sending the document as an attachment to an email message. A first collaborator with the document initiates collaboration by attaching a copy of the document to an email message and sending the message to the other collaborators. The collaborators can then view and modify the document. A problem with this form of collaboration is coordinating the changes made by the various collaborators. For example, if A, B, and C are collaborators collaborating on a document which has been sent via email to B and C by A, then each of A, B and C will have a copy of the document. Each collaborator's copy of the document is separately edited by that collaborator. Collaborators may make conflicting changes in the document. Email may be exchanged between the collaborators, including comments on the collaboration. Email may also be used to send different versions of the document. At some point, changes made by the collaborators in their separate copies will need to be examined and conflicts reconciled to produce a single document which contains the results of the collaboration.

The need to resolve conflicts may be avoided using a common server for document collaboration. Collaborators have access (for example, via a network) to a document residing on a server. Using such a collaboration server can prevent conflicts, for example, by allowing only one collaborator at a time to edit the document. However, setting up a collaboration server can be difficult. A user must, at a minimum, identify a server, set access rights for collaborators, and upload the document to the server. Managing the collaboration server is also difficult. For example, it is difficult but desirable to allow new users access to the document, or to modify or remove access rights of existing collaborators. Additionally, it is difficult to encourage users to use the collaboration server when editing, rather than editing their individual copy.

Collaborators viewing and modifying a document on a collaboration server may be able to view in-document comments from fellow collaborators. For example, Microsoft®'s WORD® word processing software allows users to include comment data in documents which may be displayed in the margins of a document or in a separate pane. However, the exchange of comments other than those included in the document among collaborators is not supported by the collaboration server.

SUMMARY OF THE INVENTION

The invention provides methods and systems to initiate and manage server-based collaboration. The invention allows a user to initiate and manage collaboration on a collaboration server using email to co-collaborators. In this way, the advantages of collaboration using email with attachments are combined with the conflict-prevention advantages of collaboration using a collaboration server.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Overview

Server-based collaboration is initiated by an email. When the user creates the email message with attachments, a collaboration website is provisioned. The collaboration website allows collaborations on the attached documents by the recipients of the message. The ease of collaboration with email and the advantages of the collaboration server are thus both available to the user.

Exemplary Computing Device

Figure 1:
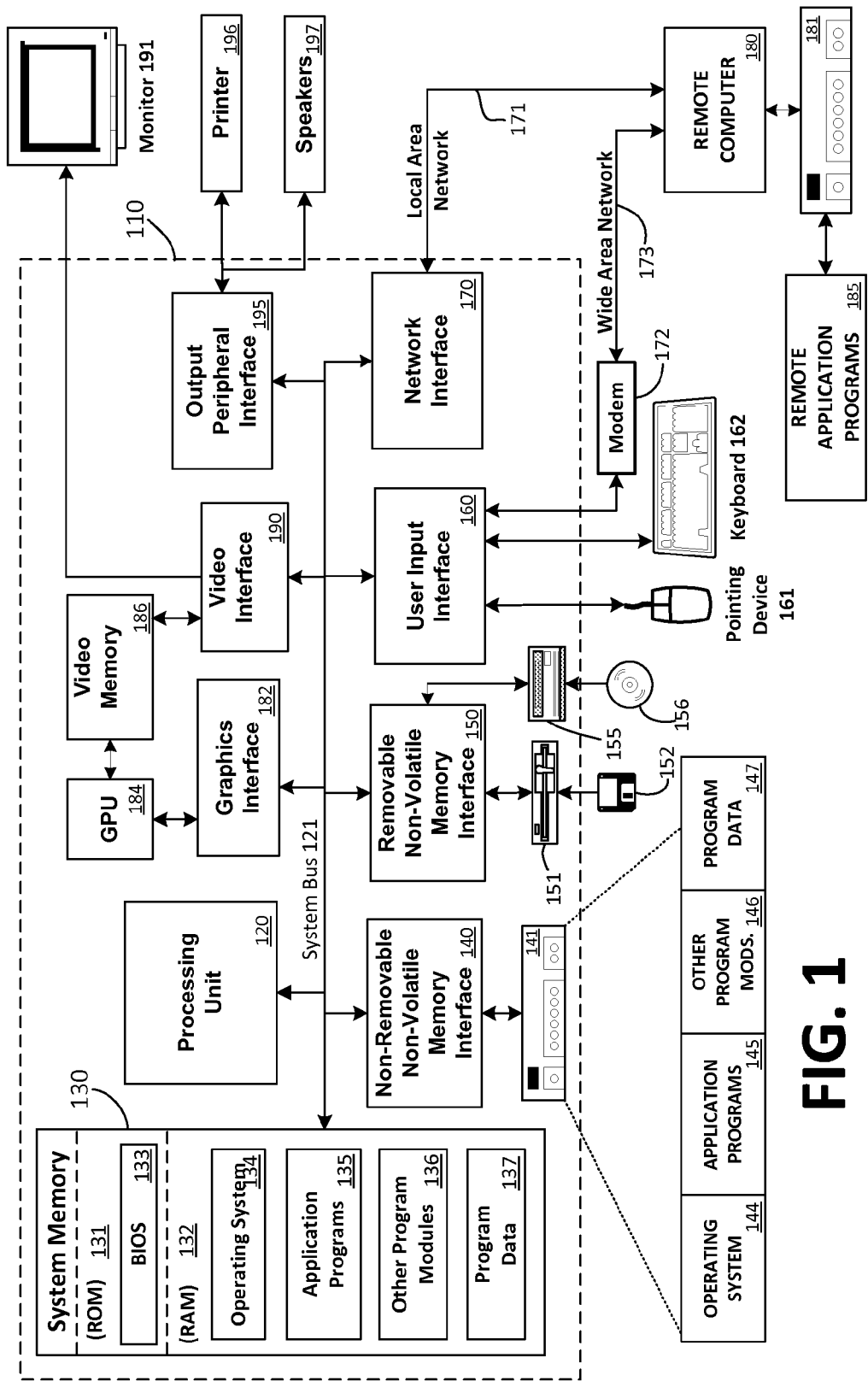
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer system 110. A monitor 191 or other type of display device is also connected to the system bus 121 via an interface, such as a video interface 190, which may in turn communicate with video memory 186. In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and requesting object, such that operation according to the invention may be performed by, supported in or accessed via all of .NET's languages and services, and in other distributed computing frameworks as well.

Initiating Server-Based Collaboration

Figure 2:
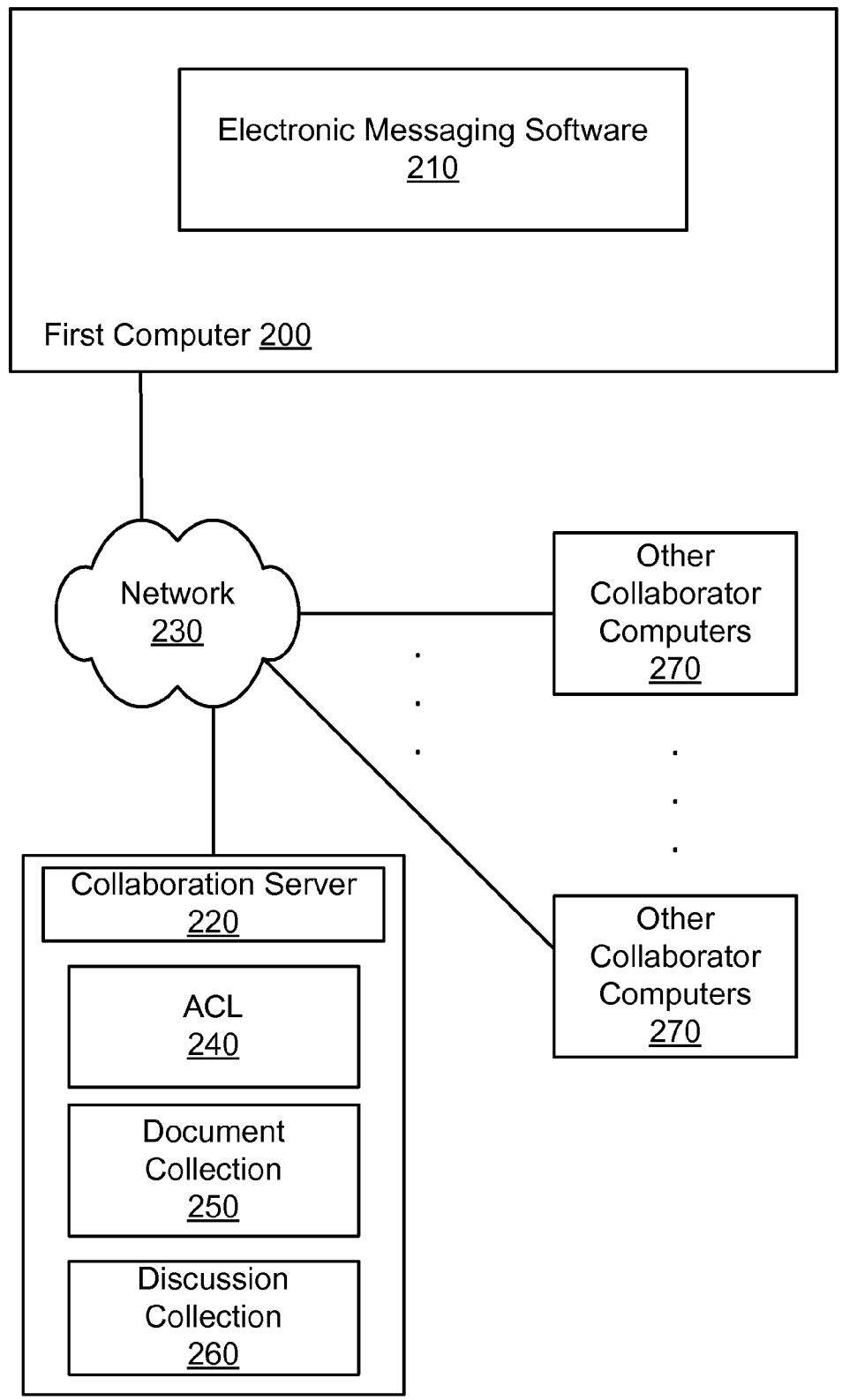
FIG. 2 is a functional diagram illustrating an example of a relationship between a first computer, a network, a collaboration server, and other computers.

As shown in FIG. 2, according to one embodiment of the invention, in order to begin a collaboration, an initiating collaborator, using first computer 200 and electronic messaging software 210, creates an electronic message. Electronic messaging software 210 may be, for example, an e-mail client application modified for use in this invention. The electronic message created by the user includes a distribution list of one or more recipient addresses. These recipient addresses are the addresses for the other collaborator(s). The initiating collaborator includes the document or documents to be collaborated upon as one or more attachments to the electronic message. A document can be any type of computer data file, with any file format, useable with any application.

In one embodiment, the electronic messaging software 210 provides a dialogue box requesting that the user select a collaboration server to use from a number of possible collaboration servers. The possible collaboration servers displayed are limited to those through which the initiating collaborator can provision a web site and, using information from the one or more recipient addresses, those which the other collaborator(s) can access. The collaboration server selected by the user from this list will be collaboration server 220 through which collaboration will be accomplished.

If only one collaboration server is available to the initial collaborator, in one embodiment a list containing only the identity of one collaboration server is displayed for the user. In another embodiment, that collaboration server 220 is selected without displaying the dialogue box. In one embodiment, the dialogue box also includes an area for the user to input a collaboration server to select or allows the user to browse for possible collaboration servers. The collaboration server list in one embodiment includes the most recently used collaboration server(s) or the most recently visited collaboration server(s).

In other embodiments, no dialogue box is presented by the electronic messaging software 210 and the collaboration server 220 used is a pre-selected server. In other embodiments, the list of possible collaboration servers does not take into account the recipient addresses.

In addition to the attached document and the distribution list, optionally, the user may include other information in the electronic message. For example, the user may describe the attached message, the collaboration purpose, or include any other information accepted by the electronic messaging software 210.

Once the initiating collaborator indicates to electronic messaging software 210 that the electronic message is ready to be sent, a collaboration web site is provisioned using the collaboration server 220 that the initiating collaborator has selected (or the one that has been pre-specified or that is the only collaboration server available, in other embodiments). In one embodiment, this is done by means of communications over a network, 230.

Once the collaboration web site has been provisioned, the recipients listed in the distribution list are added to the access control list (ACL) 240 for the collaboration server 220 to give them access to collaboration web site. In one embodiment, the addresses in the distribution list are verified or converted into a different credential to be added to the ACL for the collaboration server. This is dependent on the collaboration server used. In one embodiment, the addresses in the distribution list are added using HTTP SOAP .HTTP (Hypertext Transfer Protocol) is a protocol for communicating across a network. SOAP (Simple Object Access Protocol) is a protocol which may be used in combination with HTTP which provides a framework for describing what is included in a message, a set of encoding rules for expressing data, and a convention for representing remote procedure calls and responses. An HTTP SOAP request may be used to ask the collaboration server 220 to create the collaboration web site and to add the addresses in the distribution list to the ACL.

The attachment or attachments to the electronic message are added to the document collection 250 of collaboration server 220. Where collaboration server 220 includes discussion capability to allow a collaborator participate in a discussion by sending messages, in one embodiment the body of the electronic message is added to discussion collection 260 of collaboration server 220. In alternate embodiments, a task list or calendar is maintained on collaboration server 220 for use by the collaborators in the collaboration. The recipients listed in the ACL 240 are given access to these documents in document collection 250 (and related discussion messages in discussion collection 260, if any) of collaboration server 220 via the collaboration web site. These users can access the collaboration web site through other collaborator computers 270 which are connected to the collaboration web site, for example via the Internet or other computer network.

In addition to configuring and populating the collaboration server 220, the electronic messaging software 210 sends the electronic message to an electronic message server for delivery. The electronic message is, in one embodiment, altered to include a hyperlink to the collaboration web site and, optionally, explanatory text.

Figure 3:
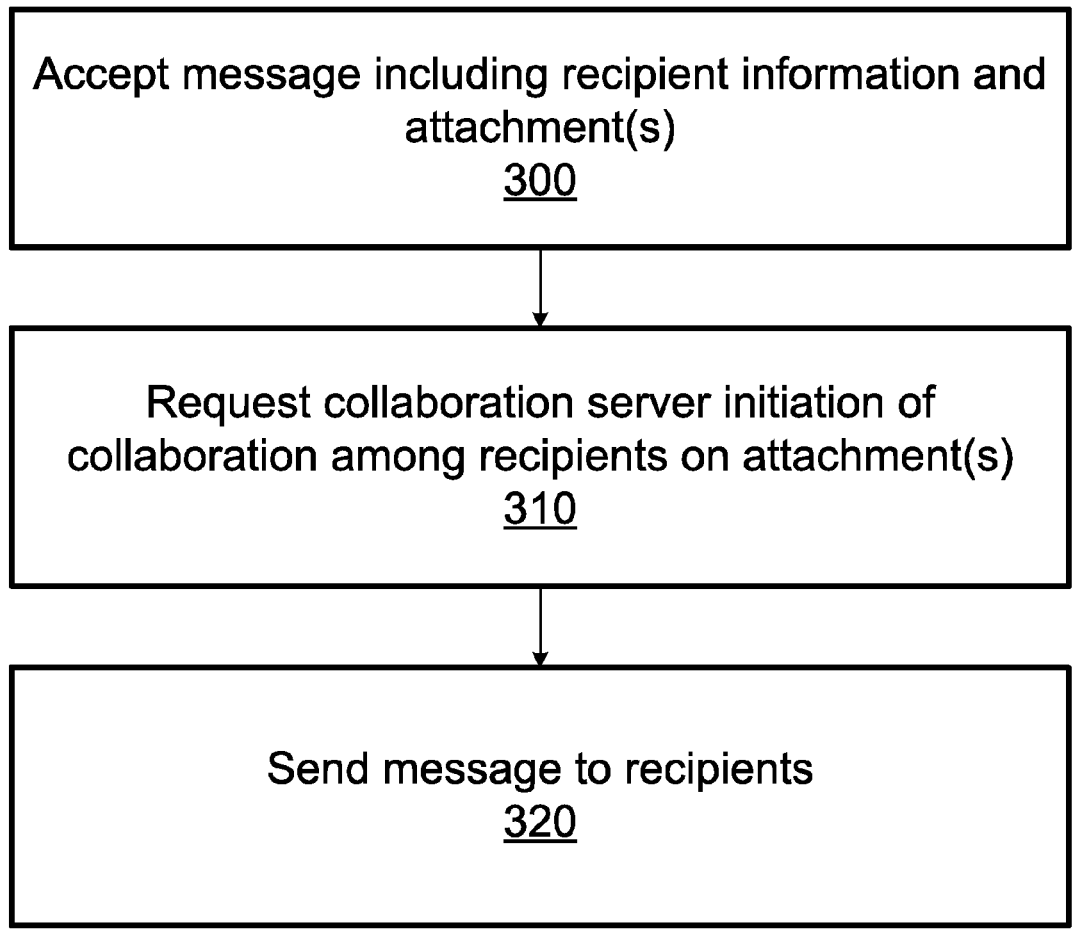
FIG. 3 is a flowchart showing the initiation of collaboration in accordance with one embodiment of the present invention.

As shown in FIG. 3, the method of the invention begins with step 300, in which a message including recipient information and one or more attached documents is accepted. In step 310, a request is sent to a collaboration server to initiate collaboration among the recipients on the one or more attached documents. In step 320, the message is sent to the recipients.

The electronic message used may be any of a variety of electronic messages. For example, an email message, meeting request, or other electronic message may be used to initiate sharing.

In one embodiment, the permissions for the collaboration server may also be set by using this electronic messaging. For example, users listed in the "To:" header of the email may receive read and write privileges for the attached documents at the collaboration site, while users listed in the "Cc:" (carbon copy) header may only have read privileges. A user listed in a "Bcc:" (blind carbon copy) header may receive no privileges. In one embodiment, each user's privilege level may be adjusted by the initiating collaborator through a tool tip or other selection means.

The electronic messaging software serves as a collaboration entry point. According to one embodiment, from this collaboration entry point, the user has two options. First, the user can send an electronic message with attachments without creating a collaboration site. Second, the user can request that a collaboration be initiated. This causes the creation of a new collaboration site with the attachments copied to that site.

Additionally, email is sent to the collaborators. Attached to the email are the attachments that have been entered on the collaboration site.

For some attachments, an application used to open or otherwise use the attachment may be known to have enhanced linking functionality that enables the application to identify that the attachment is a collaboration document. For such attachments ("qualifying attachments") a link may be inserted. When the attachment is opened by the application, the link indicates that the document is the subject of a collaboration so that updates on the local machine may be entered to the collaboration site and so that when the document is opened for reading or editing on the local machine, the version on the collaboration site is checked to determine whether a more recent version exists.

For example, if a first user is preparing a presentation document using presentation software, and would like to collaborate with a second and a third user, the first user creates an email message addressed to the second and third user. In it, the first user writes a message requesting help with the document. The first user attaches the document to the email as an attachment. A user interface pane allows the first user to select collaboration and a collaboration server. The first user then sends the email. A collaboration site is provisioned, information regarding the collaboration server is inserted into the email message, and a link is inserted into the email attachments that allows the presentation software used by the second and third users. If, for example, the second user edits the presentation document, the version on the collaboration site is updated. Then, when the third user opens the presentation document, the presentation software checks the version on the collaboration site, determines that there is a new version on the server, and opens that version for the third user to edit. The first user can then see the second and third users' edits at one time without needing to view and synchronize edits from two different documents. Discussion regarding the document can also occur on the collaboration site.

In order to add a collaborator, the electronic message is forwarded to another recipient. In one embodiment, only the initiating collaborator may add a collaborator in this way. In another embodiment, the initiating collaborator may assign the rights to add additional collaborators to any or all of the other collaborators. In one embodiment, forwarding a shared document adds new collaborators to the current collaboration site. This does not spawn a second shared copy in a new collaboration site. In this embodiment, sharing the same document with two different groups would require the initiating collaborator to possess two copies of the document In another embodiment, a second collaboration is initiated when a shared document is forwarded; and in another embodiment, the user forwarding a shared document in an email is given a choice whether to initiate a new collaboration or invite new collaborators to an existing collaboration.

Conclusion

As mentioned above, while exemplary embodiments of the present invention have been described in connection with various computing devices and network architectures, the underlying concepts may be applied to any computing device or system in which it is desirable to implement initiation of server based collaboration. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method for allowing a user to initiate collaboration on a document, comprising:
    accepting from said user a message for electronic delivery to one or more recipients, said message comprising recipient data identifying said one or more recipients and a link into one or more attached documents upon which collaboration is to be initiated, said link directing said one or more recipients to a collaboration server;
    sending a request to said collaboration server to initiate collaboration on said one or more attached documents by collaborators comprising said one or more recipients and the user; and
    sending said message to said one or more recipients.

2. The method of claim 1, further comprising:
    accepting from said user an indication comprising the identity of said collaboration server.

3. The method of claim 2, where said step of accepting from said user an indication comprising the identity of said collaboration server comprises accepting a selection of said collaboration server from a list of possible collaboration servers.

4. The method of claim 3, where said list of possible collaboration servers comprises collaboration servers accessible by said one or more recipients.

5. The method of claim 3, where said list of possible collaboration servers comprises collaboration servers most recently used for establishing a collaboration by said user.

6. The method of claim 3, where said list of possible collaboration servers comprises collaboration servers usable for establishing a collaboration by said user.

7. The method of claim 3, where said list of possible collaboration servers comprises collaboration servers most recently used for collaboration by said user.

8. A system for allowing a user to initiate collaboration on a document, comprising:
    a memory that stores computer executable code; and
    a processor that processes said computer executable code to implement:
    an electronic messaging application that accepts from said user a message for electronic delivery to one or more recipients, said message comprising recipient data identifying said one or more recipients and a link into one or more attached documents upon which collaboration is to be initiated, said link directing said one or more recipients to a collaboration server;
    a collaboration request module that sends a request to said collaboration server to initiate collaboration on said one or more attached documents by collaborators comprising said one or more recipients and the user; and
    an electronic message server that sends said message to said one or more recipients.

9. The system of claim 8, where said link comprises a hyperlink to a collaboration web site.

10. The system of claim 8, where said electronic messaging application is an email application.

11. The system of claim 8, where said electronic messaging application is a scheduling application.

12. The system of claim 8, where said message sent to said one or more recipients comprises a modified version of at least one of said one or more attached documents, said modified version comprising metadata regarding said collaboration.

13. A method for initiating collaboration, comprising:
    generating a message for electronic delivery to one or more recipients, said message comprising recipient data identifying said one or more recipients and a link into one or more attached documents upon which collaboration is to be initiated, said link directing said one or more recipients to a collaboration server;
    initiating said collaboration server for initiating collaboration on said one or more attached documents; and
    sending said message to said one or more recipients.

14. The method of claim 13, where said collaboration comprises a collaboration web site managing collaboration by collaborators.

15. The method of claim 14, where said collaboration web site includes at least one selected from the group comprising: discussion capability for maintaining a discussion among collaborators and/or a task list for said collaboration.

16. The method of claim 14, where said step of sending said message to said one or more recipients comprises modifying at least one of said one or more attached documents to include metadata regarding said collaboration.

* * * * *